May 27, 1952 P. M. PROSSER 2,598,299
ARMREST FOR VEHICLES
Filed Feb. 21, 1950
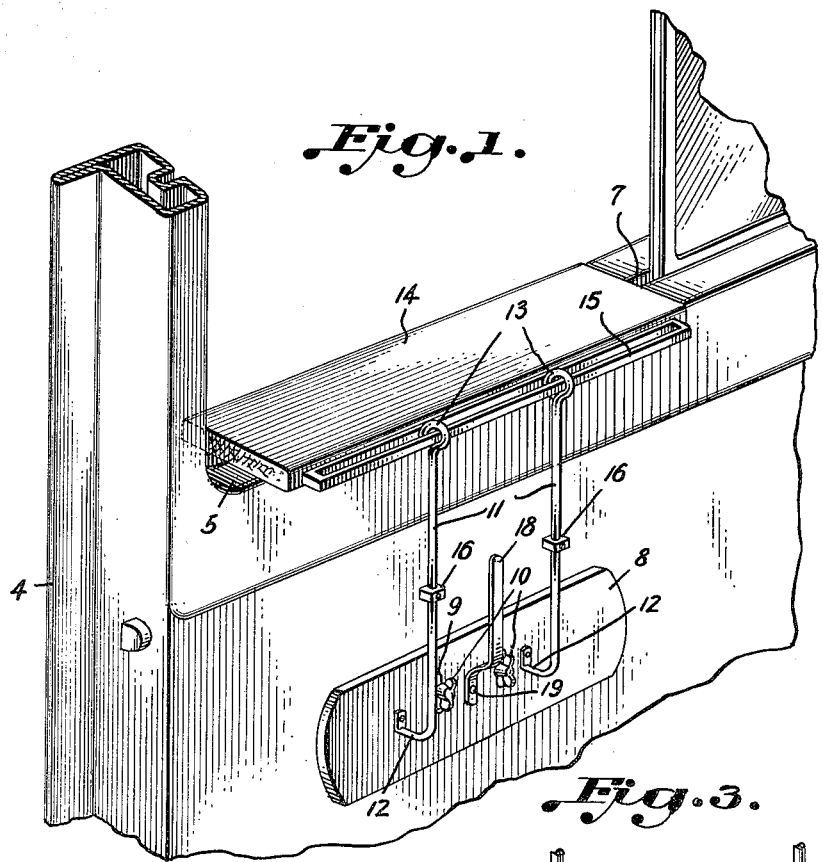
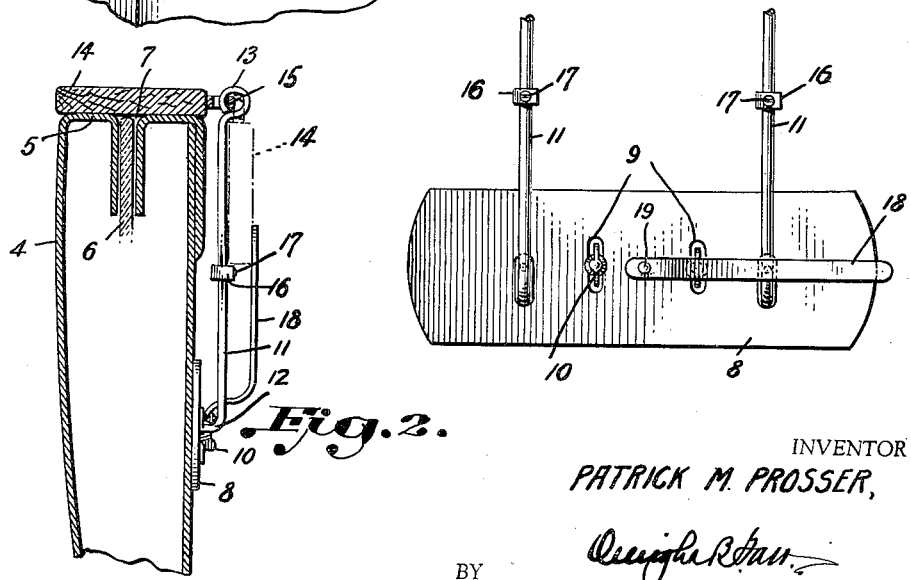
INVENTOR
PATRICK M. PROSSER,
BY
ATTORNEY Patented May 27, 1952

2,598,299

UNITED STATES PATENT OFFICE 2,598,299

ARMREST FOR VEHICLES

Patrick Michael Prosser, Jacksonville, Fla.

Application February 21, 1950, Serial No. 145,547

5 Claims. (Cl. 296—49.2)

This invention is an arm rest for vehicles, adapted particularly for use in connection with motor vehicles to afford the occupant thereof a suitable and comfortable rest for the elbow or forearm in the window opening of the vehicle.

The primary object of the invention is to provide an arm rest of such construction as to enable it to be applied with ease and facility to the standard motor vehicles without modifying or altering any of the parts or equipment of the latter, and which is capable of providing a comfortable and efficient arm rest disposed in and resting upon the sill of the motor vehicle window.

A further object of the invention is to provide an arm rest of the character stated which is capable of very easily and quickly being moved within the vehicle and in an out of the way place when not in use.

A still further object of the invention is to provide an arm rest of the character and for the purposes generally stated which is composed of few readily assembled and inexpensive parts, which parts are so constructed and assembled as to effectively support the arm rest in operative position upon the vehicle, which has its parts so constructed and assembled as to minimize the opportunity of wear, breakage or derangement, which is capable of adjustments in order that the arm rest may be adapted to vehicles of different types, and which will prove highly practical and efficient in operation.

With the foregoing objects in view, together with others which will appear as the description proceeds, the invention consists in the novel construction, combination and arrangement of parts, all as will be described more fully hereinafter, illustrated in the drawings, and particularly pointed out in the claims.

In the drawings:

Fig. 1 is a detail fragmentary perspective view of a portion of the side of a motor vehicle viewed from the interior thereof and illustrating as applied thereto an arm rest constructed in accordance with the invention, Fig. 2 is a vertical transverse sectional view taken through the vehicle body and showing the arm rest of my invention partly in section, and Fig. 3 is a front elevation of the arm rest supporting plate employed in carrying out the invention.

Referring now more particularly to the drawing, it is my purpose to provide an arm rest particularly for the accommodation and comfort of the vehicle operator, and therefore the rest is shown as applied to the door window of the motor vehicle. It will be understood, however, that the use of the invention is not to be restricted to such use as it may equally as well be applied to other window openings in the vehicle body. In general, the invention resides in a movable plate or platform of a size and shape to fit conveniently and comfortably within the window opening and to rest upon the sill thereof in horizontal position in order that the arm or elbow of the occupant may rest and be relaxed upon the platform. The invention further resides in an arm rest of this general character capable of being easily and quickly moved to a position wholly within the vehicle and in an out of the way place so as not to interfere with the person of the operator or other occupant of the vehicle.

In particular, the door of the vehicle, or side of the vehicle as the case may be, is indicated at 4 and the window opening therein provides the horizontally disposed sill 5. The door is provided with the usual vertically slidable glass pane 6 seated within the door frame and capable of being raised therein to closed position through the window slot 7 as will be understood.

The inner panel or face of the door 4 has secured thereto a plate 8 of flat elongated form, which plate is preferably made of light and inexpensive metal. This plate is provided with spaced parallel transversely disposed slots 9 through which protrude bolts rigidly secured at their inner ends to the door panel and engaged at their outer protruding ends with wing nuts or suitable screws indicated at 10. It is obvious that this construction permits of the plate 8 being readily adjusted in vertical direction upon the door and yet tightening of the wing nuts 10 rigidly secures the plate in the desired adjusted position.

Rigidly secured at their lower ends to the plate 8 and rising therefrom in spaced parallel relationship to one another are arms 11. These arms are provided at their lower ends with inwardly projecting portions 12 which are secured to the outer face of the plate 8, in order that the upstanding arms 11 may be maintained in spaced relationship from the adjacent face of the door panel. The upper ends of the arms 11 terminate in loops 13, these loops terminating a slight distance above the plane of the sill 5 of the door.

The arm rest per se consists of a platform 14 made of wood, metal, plastic or any other desired material of substantially flat rectangular form, and of a size to conveniently fit within the window opening of the vehicle and adapted to rest in horizontal position upon the sill 5 thereof. One of the longitudinal edges of this platform is provided with a longitudinally disposed rod 15 spaced in parallel relationship to the adjacent edge of the said platform. This rod 15 is loosely engaged by the loops or eyes 13 at the upper ends of the spaced parallel posts or arms 11. The construction is such that the platform 14 is capable of free swinging movement in an arc with the loops or eyes 13 as the center. When in operative position, the platform 14 will be horizontally disposed and in resting relationship upon the sill 5 of the door as shown in Figs. 1 and 2. Due to the length of the rod 15, the platform 14 is capable of various adjustments longitudinally of the sill to accommodate the user. When not in use, the platform 14 may be swung inwardly to the position shown by dotted lines in Fig. 2, or in parallelism with the rods 11 and the inner face of the door 4. To support the platform 14 in inside position, adjustable stops 16 are provided upon the arms or posts 11. These stops may be maintained in proper adjusted positions by set screws 17 as will be understood. To additionally support the platform 14 against any tendency toward vibration when in inoperative position, a spring finger 18 is provided. This finger is attached at its lower end to the plate 8 by means of a rivet or other fastening member 19, capable of supporting the spring finger for turning movement. In operation, under normal conditions and when the arm rest is not desired, it will assume the position shown by dotted lines in Fig. 2. When in this position, the platform 14 will rest upon the stop 16 which will have been adjusted to such position as to be engaged by the lower edge of the platform 14 when swung to the limit of its movement inwardly of the vehicle. The spring finger 18 is engaged with the inner face of the platform so as to maintain it in snug engagement not only with the stop 16, but against the upstanding arms 11, whereby to prevent vibration of the platform when in this inoperative position. When it is desired to extend the platform to operative position, it is but necessary to slightly rotate the spring finger 18 upon its pivot 19, whereupon the platform 14 may be swung upwardly and outwardly in an arc until it arrives in horizontal position upon the sill 5. When so positioned, the arm of the user is prevented from coming in contact with the door sill. It will be understood that the platform may be made of heat-resistant material or may be suitably upholstered to better accommodate the arm of the user as well as to resist heat. In addition to the use here disclosed, it is apparent that the platform may be used as a rest for use in roadside lunches if desired, and to that end the platform 14 may be made extensible in any desired manner.

I claim:

1. A rest comprising a pair of arms arranged in upstanding parallel relationship and secured at their lower ends on the inside of a door and below the window sill thereof, said arms terminating at their upper ends in substantially the same horizontal plane with the said sill, a platform hingedly connected at one edge to the upper ends of said arms, and means whereby said arms may be adjusted vertically upon said door.

2. A rest comprising a pair of arms arranged in upstanding parallel relationship on the inside of a door below to the window sill thereof, said arms terminating at their upper ends in substantially the same horizontal plane with said sill, a platform, a hinged member connecting one edge of said platform to the upper ends of said arms, and stops on said arms below the upper ends thereof to be engaged by and in support of said platform when the platform has been moved inwardly of said door.

3. In an arm rest, a plate secured to the inner face of a door and below the window sill thereof, a pair of arms secured at their lower ends to said plate and rising therefrom in spaced parallel relationship to one another and spaced from said door, the upper ends of said arms terminating in substantially the same horizontal plane with the sill of said window, a platform hingedly connected with the upper ends of said arms adapted when swung outwardly to rest in horizontal position upon said sill and when swung inwardly to assume vertical position against said arms, and means for adjusting said plate toward or away from said window sill.

4. In an arm rest, a plate affixed to the inner face of a door and below the window sill thereof, a pair of arms secured at their lower ends to said plate and rising therefrom in spaced parallel relationship to one another and spaced from said door, loops at the upper ends of said arms disposed in substantially the same horizontal plane with the sill of said window opening, a platform, a bar secured to one edge of said platform and in spaced relationship thereto and extending through said loops, whereby said platform assumes a horizontal position upon said sill when swung to outer position and means on said arms for supporting said platform in vertical position when the latter is moved to its innermost position.

5. In an arm rest, a plate rigidly secured to the inner face of a door below the window opening thereof, a pair of arms rigidly secured at their lower ends to said plate and rising therefrom in spaced parallel relationship to one another and spaced from said door, loops on the upper ends of said arms terminating in substantially the same plane with the sill of said door opening, a platform, a rod secured along one edge of said platform and spaced therefrom, said arm engaged in said loops, stop members adjustably secured upon said arms, and a spring finger pivoted to said plate and rising therefrom above the location of said stops.

PATRICK MICHAEL PROSSER.

REFERENCES CITED

The following references are of record in the file of this patent:

UNITED STATES PATENTS

| Number | Name | Date |
| --- | --- | --- |
| 1,407,174 | Simpson | Feb. 21, 1922 |
| 1,674,205 | Johnson | June 19, 1928 |
| 1,742,447 | McKeag | Jan. 7, 1930 |
| 2,296,628 | Coppock | Sept. 22, 1942 |